United States Patent [19]

Plein

[11] Patent Number: 5,791,225
[45] Date of Patent: Aug. 11, 1998

[54] KITCHEN APPLIANCE FOR CUTTING MATERIAL

[75] Inventor: Josef Plein, Dudeldorf, Germany

[73] Assignee: A. Borner GmbH, Niederkail, Germany

[21] Appl. No.: 672,030

[22] Filed: Jun. 26, 1996

[30] Foreign Application Priority Data

Jun. 27, 1995 [DE] Germany .............. 195 23 272.0

[51] Int. Cl.$^6$ .................................................. B26D 1/02
[52] U.S. Cl. ........................... 83/853; 83/858; 83/932
[58] Field of Search .................... 83/932, 857, 858, 83/856, 875; 30/287, 279.6, 278, 304; 99/545; 241/273.1, 168

[56] References Cited

U.S. PATENT DOCUMENTS

| | | | |
|---|---|---|---|
| 97,019 | 11/1869 | Witsil | 241/273.1 |
| 118,720 | 9/1871 | Heberling | 83/858 X |
| 490,223 | 1/1893 | Bergreen | 83/858 X |
| 678,514 | 7/1901 | Regnier | 83/858 X |
| 1,436,721 | 11/1922 | Newell | 30/279.6 |
| 1,738,148 | 12/1929 | Opitz | 83/857 X |
| 1,845,522 | 2/1932 | Rowley | 241/273.1 X |
| 2,103,537 | 12/1937 | Killman et al. | 83/858 X |
| 2,376,408 | 5/1945 | Whann | 30/304 X |
| 2,447,714 | 8/1948 | Richards | 241/95 |
| 3,610,304 | 10/1971 | Popeil | 241/92 |
| 3,890,867 | 6/1975 | Wilson | 83/858 X |
| 4,038,892 | 8/1977 | Popeil | 83/858 X |
| 4,790,488 | 12/1988 | Borner | 30/279.6 X |
| 4,848,680 | 7/1989 | Borner | 30/287 X |
| 5,001,835 | 3/1991 | Borner | 30/279.6 X |

FOREIGN PATENT DOCUMENTS

| | | |
|---|---|---|
| 0 189 743 | 8/1986 | European Pat. Off. . |
| 1 158 673 | 12/1963 | Germany . |
| 32 11 896 | 10/1983 | Germany . |

*Primary Examiner*—Maurina T. Rachuba
*Attorney, Agent, or Firm*—Hill & Simpson

[57] ABSTRACT

A kitchen appliance for cutting material, preferably fruit or vegetables, into strips is disclosed. The kitchen appliance includes a base plate with sliding faces provided on its upper side and at least one row of blades is arranged between said sliding faces and extends essentially transversely to the cutting direction of the appliance. The blades thereof have upper cross webs that form cutting edges which project beyond the sliding faces in height and are fashioned open toward the underside of the base plate. The upper cross webs also include an essentially centrally arranged depressions extending in a direction toward the underside of the base plate. An approach channel is provided on the upper cross web of each of the blades, in front of the depression, for cutting guide channels into the material to be cut. In one embodiment, the channel cutter includes at least one v-shaped approach channel pointing in the direction of the underside of the base plate. In another embodiment, the channel cutter includes at least two v-shaped approach channels pointing in the direction of the upper side of the base plate and an interspace defined by the approach channels and arranged in front of the depression.

24 Claims, 3 Drawing Sheets

US 5,791,225

KITCHEN APPLIANCE FOR CUTTING MATERIAL

BACKGROUND OF THE INVENTION

1. Field of the Invention

The invention is directed to a kitchen appliance for cutting material, preferably fruit or vegetables, into strips. Such kitchen appliances typically have a base plate with sliding faces on its upper surface and at least one row of blades arranged between the sliding faces and extending essentially transversely to the cutting direction of the appliance. The blades thereof have cutting edges which project beyond the sliding faces in height and are fashioned to be open toward the underside of the base plate. The blades include upper cross webs which project beyond the sliding faces and include essentially centrally-arranged depressions extending in a direction toward the underside of the base plate.

2. Description of the Prior Art

EP-A-0 189 743 discloses such a kitchen appliance. However, its preferred function is as a fries cutter and it can only cut extremely narrow strips. If the blades are enlarged to project further beyond the sliding faces, the modified blades lead to a broader cut product but do not lead to a desired, thicker cut product. If one attempts to enlarge the blades only in their horizontal expanse, then the blades no longer assure adequate guidance of the product to be cut through the appliance.

SUMMARY OF THE INVENTION

One object of the present invention is to provide a kitchen appliance that cuts off thin but broader strips of material and enables a clean, guided deflection of the strip that has been cut off. The cut-off strip should thereby be regularly or uniformly cut.

This object is inventively achieved by providing the blades with channel cutting means for cutting guide channels into the material to be cut.

In one embodiment, the channel cutting means comprises at least one v-shaped approach channel pointing in the direction of the underside of the base plate. In an alternate embodiment, the channel cutting means comprise at least two v-shaped approach channels pointing in the direction of the upper side of the base plate and defining an interspace therebetween. In that embodiment, the approach channels are matched to the size of the depression in both the vertical expanse as well as the horizontal expanse as viewed transversely relative to the cutting direction. In the respective embodiments, the at least one approach channel and the interspace between the at least two approach channels are arranged essentially centrally in front of the depression as viewed in cutting direction.

When the material to be cut encounters the cutting edges, the approach channels formed on the cutting edges of the blades create one or more v-shaped depressions or elevations in the strip of material to be cut. These depressions or elevations in the strip serve as guide channels. When the material is pushed farther over the blade strip, the tip of the depression in the blade then engages into the guide channels created by the approach channels to facilitate effective cutting of the material. The depression is preferably ogive shaped.

Even when it is broad and extremely thin, the strip that has been cut off is thus exactly guided by the kitchen appliance of the present invention.

The strip is also especially regularly or uniformly cut in this way since an uncontrolled breaking or cutting of the strip at an undesired location is avoided. Such uncontrolled breaking or cutting of the strip is otherwise capable of being caused by an undirected and, thus, irregular deflection of the individual strips that are only partly cut at first.

The guide channels formed by the v-shaped approach channels also create a structured surface present both at the upper side as well as the underside of the cut product, which particularly meets aesthetic demands.

In one embodiment, it is especially advantageous to provide the blades with a plurality of approach channels that point in the direction of the underside of the base plate. This forms a plurality of guide channels that enable an even more reliable engagement of the depression into the guide channels of the cut-off strip. This is especially important when softer and not especially stable material is to be cut. The surface of the strip that is cut off is thereby also structured over an extensive area to provide an improved aesthetic impression.

A similar effect is achieved when, instead of the approach channels pointing in the direction of the underside of the base plate, two or more approach channels pointing in the direction of the upper side of the base plate are provided in two opposite regions on the upper cross webs of the blades. Such a construction provides an interspace, in which no channels are generally provided, between these two regions.

In an alternate embodiment, however, approach channels pointing in the direction of the underside of the base plate can also be provided in the interspace. The very pronounced height differences that are produced by such a construction in the surface of the strip that has been cut off lead to an especially effective engagement of the depression into the material that has been cut, so that an extremely reliable guidance of the cut product is achieved. The surfaces of the strips that are cut off by such a construction comprise a structured surface over nearly their entire area.

The approach channels provided on the blades can comprise both the same horizontal and vertical expanses as well as different vertical and/or horizontal expanses. As a result thereof, the shape of the guide channels produced in the cut product can be exactly matched to the shape of the depression provided in the upper cross web of the blade. Accordingly, many possibilities are available for creating differently structured surfaces in the material to be cut so that the surface can be formed to match aesthetic demands.

In one preferred embodiment, the at least one row of blades is fashioned from a metal band having upper cross webs and lower cross webs with lateral or side webs extending therebetween. The metal band may be bent to have a meander-like shape formed of one piece. The lower cross webs of the blades are also arranged under the sliding faces of the appliance and are secured in or at the base plate.

In one embodiment, it is preferred that the lower cross webs of the blade rows are cast into the base plate and are thus firmly joined to the base plate of the kitchen appliance. Undesirable fastener elements are thereby eliminated, even at the underside of the kitchen appliance. The blade strip or metal band, however, can also be firmly joined to the base plate of the kitchen appliance with joining means that may be selected from the group consisting of glue, screws, clamps, and ultrasound welding, for example.

In another embodiment, the blade strip is detachably and interchangeably secured to the base plate. As needed, different blade strips can thereby be used in order to create, for example, differently structured surfaces on the cut material. The detachable blade also permits potentially damaged blades to be replaced in order to avoid the entire, high-quality kitchen appliance becoming unusable in such instances.

In embodiments in which the blade rows are formed of metal bands, the width of the upper cross webs preferably corresponds approximately to the width of the lower cross webs.

In an alternative embodiment, the one or more blade rows are composed of individual blades that are respectively let into the base plate or are secured thereto in some other suitable manner.

In a further embodiment, the blade row or rows are arranged to deviate from a 90° angle with reference to the cutting direction. The cutting edges, however, continue to be aligned such that the cutting edges extend at right angles relative to the cutting direction. This has the advantage that the material to be cut is not simultaneously cut over its entire width but is only cut over narrow regions in a continuous fashion from one side of the appliance to the other during the cutting process. This results in lower forces being needed for pushing the material over the sliding faces. The user of the kitchen appliance is therefore relieved when cutting more solid cut material. In addition, softer and less solid cut materials (such as, for example, parboiled potatoes) are not damaged by the holding and pushing forces that are required during the cutting process.

In a further embodiment, two blade rows are provided between the sliding faces. These blade rows are preferably arranged in rows offset relative to one another. This enables a uniform processing of the surface of the material to be cut such that—apart from the incised guide channels—the cut surface is then substantially planar.

In an especially preferred embodiment, the upper cross webs of the blade rows take the form of duokerf blades. This enables an especially simple and rapid processing of the material since the material can be moved back and forth between the sliding faces without having to be taken off from the sliding faces.

In another embodiment, the base plate may be advantageously contoured in a slightly upwardly directed arc in the region of the blade row or rows or in those regions wherein the blades are accepted. The contoured surface provides a lead angle (albeit small) for cutting, for example, a fruit.

DESCRIPTION OF THE PREFERRED EMBODIMENTS

Figure 1:
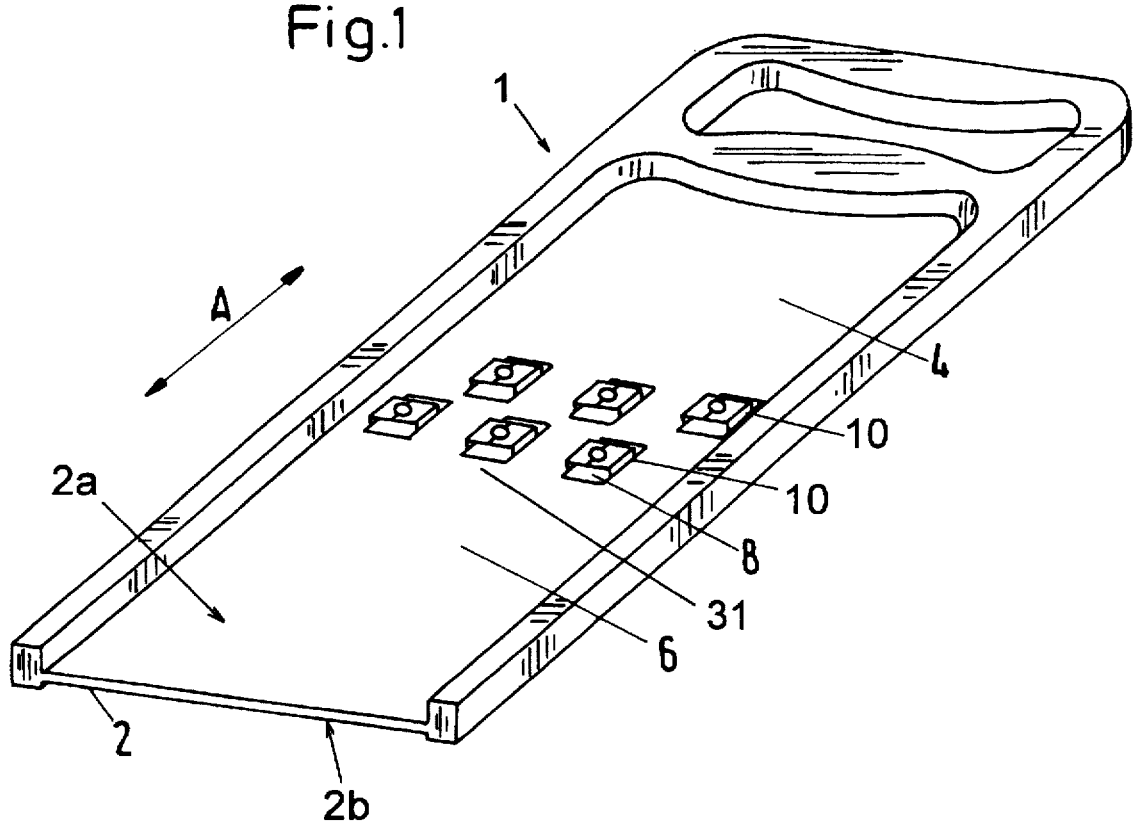
FIG. 1 shows a perspective, schematic overall view of a first embodiment of the kitchen appliance of the present invention (the structure of the blade rows is particularly indicated here).

FIG. 1 shows one embodiment of the inventive kitchen appliance of the present invention. The kitchen appliance 1 is essentially composed of a planar base plate 2 which includes an upper surface or side 2a and a lower surface or side 2b. The base plate 2 also includes first and second sliding faces 4 and 6 on its upper surface 2a, and the sliding faces 4 and 6 extend in series in a cutting direction A along the upper surface 2a.

Blade rows 10 for cutting the material, particularly fruit and vegetables, are arranged between the sliding faces 4 and 6 and are aligned essentially transversely relative to the cutting direction A. Under the blade rows 10, the base plate 2 includes clearances 8 for discharging the cut-off shavings to the underside of the kitchen appliance. The material to be cut is moved back and forth over the blade rows 10 between the sliding faces 4 and 6 until the material has been completely cut up. For protecting against injury, the material to be cut may be secured by a holding means (not shown) during the cutting operation.

In one preferred embodiment, blade row 10 is composed of a blade strip or metal band which is bent meander-shaped and has upper cross webs 12 and lower cross webs 14 which are connected by side webs.

Figure 2:
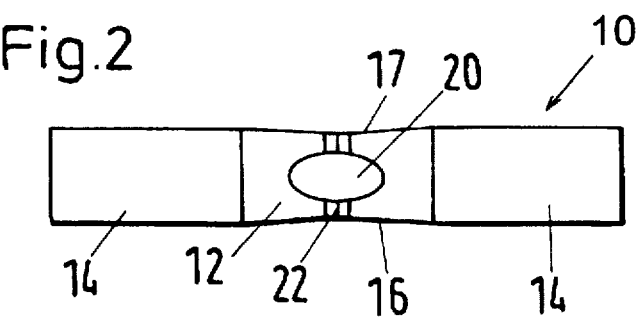
FIG. 2 shows a plan view of a portion of a first embodiment of an inventive blade strip of the present invention.
Figure 3:
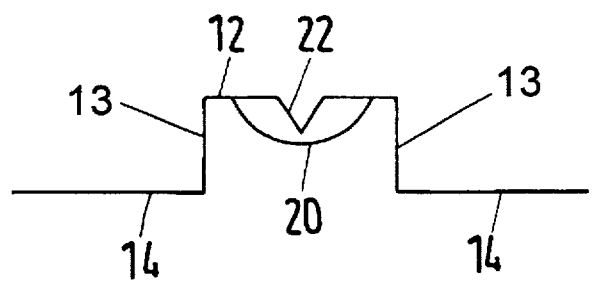
FIG. 3 shows a side view of the blade strip shown in FIG. 2

In particular, FIG. 2 shows a plan view of such a blade strip 10a having an upper cross web 12 and two lower cross webs 14 that are connected to the upper cross web 12 by side webs 13 (FIG. 3). A central depression 20 is arranged in the upper cross web 12 of the blade strip. The upper cross web 12 of the blade strip also includes channel cutting means for cutting at least one guide channel into the material to be cut. In the embodiment shown in the drawings, the channel cutting means is shown as an approach channel 22, which is interrupted by the depression 20, and which is worked into the upper cross web 12 between the blade edges 16 and 17 of the upper cross web 12.

The side view in FIG. 3 more clearly shows the v-shaped approach channel 22 and the depression 20 which are both centrally formed in the upper cross web 12. The depression 20 points toward the underside 2b of the base plate 2 in the kitchen appliance 1.

Figure 4:
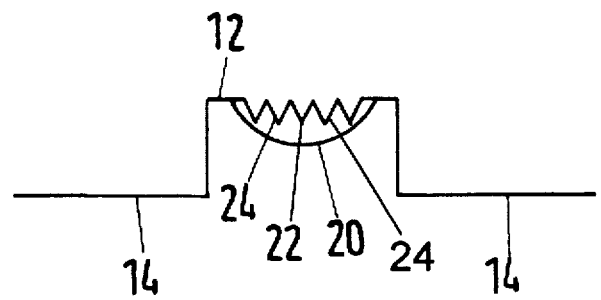
FIG. 4 shows a side view of a portion of an alternate embodiment of the blade strip of the present invention.

FIG. 4 shows a further embodiment wherein additional approach channels 24 pointing in the direction of the underside 2b of the base plate 2 are formed to the right and left of the approach channel 22.

Figure 5:
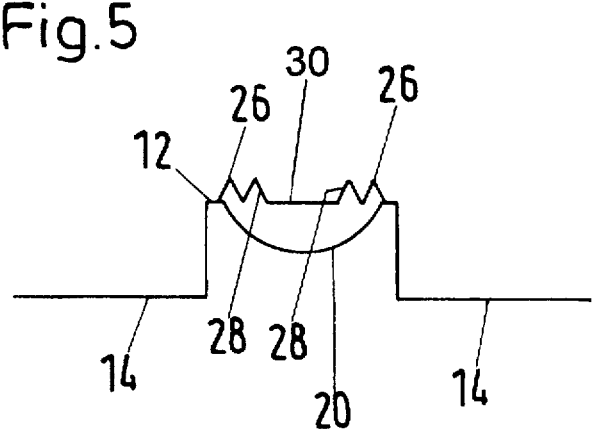
FIG. 5 shows a side view of a portion of an alternate embodiment of the blade strip of the present invention.

In the embodiment shown in FIG. 5, approach channels 26 pointing in the direction of the upper side 2a of the base plate 2 are provided next to the two approach channels 28 also pointing in the direction of the upper side 2a of the base plate 2. The approach channels 26 and 28 are arranged in two groups at the edge regions of the upper cross web 12 to define an interspace 30 between these two groups. In this embodiment, the interspace 30 cuts a guide channel into the material to be cut, and the depression 20 engages the guide channel cut into the strip by the interspace 30.

Figure 6:
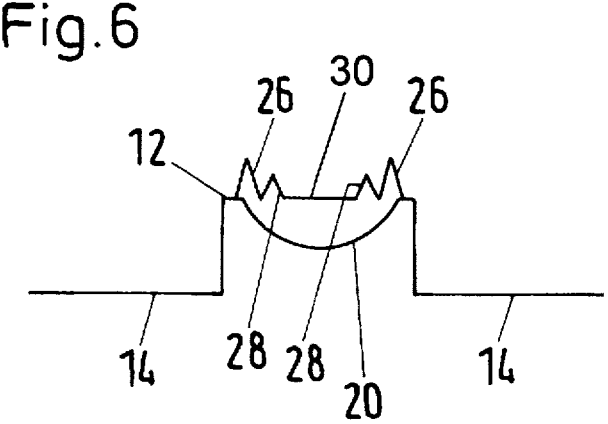
FIG. 6 shows a side view of a portion of an alternate embodiment of the blade strip of the present invention.

FIG. 6 shows an embodiment wherein the additional approach channels 26 have a greater vertical expanse than the approach channels 28. As a result thereof, the guide channel cut into the strip (and into which the depression 20 engages after cutting the material) is more highly structured and emphasized.

Figure 7:
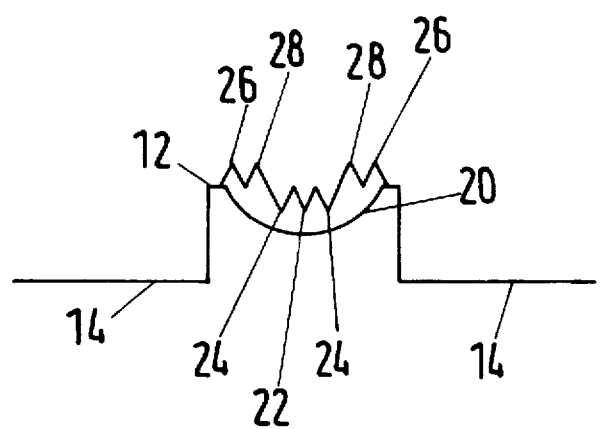
FIG. 7 shows a side view of a portion of an alternate embodiment of the blade strip of the present invention.

FIG. 7 shows a combination of approach channels 22 and 24 pointing in the direction of the underside of the base plate 2 and of approach channels 26 and 28 pointing in the direction of the upper side of the base plate 2. A highly structured surface with a pronounced guide channel in the cut off strips is achieved by such an arrangement of the channels 22, 24, 26 and 28. The channels 22, 24, 26, and 28 are approximately the same or identical in size (in both the vertical and horizontal expanse). However, they can also definitely comprise different expanses (including both vertical and horizontal expanses). For example, the approach channels 28 can be enlarged in vertical expanse in order to further enlarge the depth of the guide channel. The approach channels 26 then serve for stabilizing the surface structuring on the cut material that is created.

Instead of the blade strip or metal band, a plurality of individual blades can also be provided in all embodiments. The individual blades in such a construction are provided with the above-described structural features individually or in combination. The individual blades also include suitable projections for being let into or secured to the base plate 2.

The functioning of the kitchen appliance is explained below with reference to the embodiment shown in FIG. 1 which includes two blade rows 10 arranged behind one another and offset.

Due to the offset arrangement of the upper cross webs 12 of the individual blade strips 10a, a respective upper cross web 12 of the one blade strip 10 lies in front of or behind a lower cross web 14 of the other blade strip 10a.

In use, the material to be cut is placed, for example, on the first sliding face 4 and is then guided in cutting direction A over the blade 10 strips onto the second sliding face 6, whereby strips of the material are cut off at the underside. Due to the offset arrangement of the blades, the cut material is nearly planar when it has been entirely guided over both blades rows 10 onto the sliding face 6. The inventive blade strips 10a thereby assure a reliable and controlled guidance of the strip that has been cut off when cutting the material.

Breakage or a premature severing of the strip produced by undirected deflection is thereby avoided with the appliance of the present invention. The uniform strips of the material that have been cut off drop out through the clearances 8 provided at the underside of the base plate 2.

The material is then guided back and forth over the blade strips 10 between the two sliding faces 4 and 6 in alternation until it has been completely processed. The holder device for holding the material to be cut, during the cutting operation, in order to avoid injury is not shown here.

The base plate 2 may also include a slightly upwardly directed arc or contoured surface in the region of the blade rows as generally designated by the numeral 31 in FIG. 1. The contoured surface provides a lead angle (albeit small) for cutting, for example, a fruit.

The present inventive kitchen appliance is particularly advantageous for processing vegetables and fruits for an aesthetic arrangement at salads or the like, for example, at a buffet.

Although modification and changes may be suggested by those skilled in the art, it is the intention of the inventor to embody within the patent warranted hereon all changes and modifications as reasonably and properly come within the scope of his contribution to the art.

I claim as my invention:

1. A kitchen appliance for cutting material into strips, said appliance comprising:
    a planar base plate having upper and lower surfaces and first and second sliding faces arranged in series along said upper surface of said planar base plate in a cutting direction;
    at least one blade row disposed on said planar base plate between said first and second sliding faces and being arranged essentially transversely to said cutting direction;
    said at least one blade row including at least one upper cross web which forms cutting edges that project in height beyond said first and second sliding faces of said base plate;
    a centrally-arranged depression provided on said at least one upper cross web and extending toward said lower surface of said base plate; and
    channel cutting means provided on said at least one upper cross web of said at least one blade row generally in front of said depression, as viewed in said cutting direction, for cutting at least one guide channel into a material to be cut.

2. A kitchen appliance as claimed in claim 1 wherein said channel cutting means comprises at least one v-shaped approach channel pointing in the cutting direction of said lower surface of said base plate.

3. A kitchen appliance as claimed in claim 2 wherein said channel cutting means further comprises additional approach channels which are provided adjacent to said at least one v-shaped approach channel and which point in the direction of said lower surface of said base plate.

4. A kitchen appliance as claimed in claim 2 wherein said at least one v-shaped approach channel and said additional approach channels have substantially the same horizontal and vertical expanse.

5. A kitchen appliance according to claim 2 wherein said at least one v-shaped approach channel and said additional approach channels have different expanses.

6. A kitchen appliance as claimed in claim 1 wherein said channel cutting means comprises at least two v-shaped approach channels pointing in the direction of said upper surface of said base plate and an interspace defined by and between said at least two v-shaped approach channels, said interspace being arranged substantially in front of said depression as viewed in said cutting direction.

7. A kitchen appliance as claimed in claim 6 wherein said channel cutting means further comprises additional approach channels pointing in the direction of said upper surface of said base plate, said additional approach channels being provided outside of said interspace and adjoining said at least two v-shaped approach channels.

8. A kitchen appliance as claimed in claim 7 wherein said at least two v-shaped approach channels and said additional approach channels have substantially the same horizontal and vertical expanse.

9. A kitchen appliance as claimed in claim 7 wherein said at least two v-shaped approach channels and said additional approach channels have different expanses.

10. A kitchen appliance as claimed in claim 6 wherein said at least two v-shaped approach channels are substantially matched to the size of said depression in vertical and horizontal expanse as viewed transversely relative to said cutting direction.

11. A kitchen appliance as claimed in claim 1 wherein said channel cutting means comprises at least one v-shaped approach channel pointing towards said lower surface of said base plate and being arranged substantially in front of said depression and at least two v-shaped approach channels pointing toward said upper surface of said base plate and being arranged along opposite sides of said at least one v-shaped approach channel.

12. A kitchen appliance as claimed in claim 11 wherein said channel cutting means further comprises a first set of additional approach channels pointing toward said lower surface of said base plate and being arranged adjacent to said at least one v-shaped approach channel and a second set of additional approach channels pointing towards said upper surface of said base plate and being arranged adjacent to said at least two v-shaped approach channels.

13. A kitchen appliance as claimed in claim 1 wherein said at least one blade row is formed of one piece from a meander-shaped metal band having upper cross webs, lower cross webs and side webs connecting said upper cross webs and said lower cross webs, said lower cross webs being arranged under said first and second sliding faces and being secured to said base plate.

14. A kitchen appliance as claimed in claim 13 wherein said lower cross webs are cast into said base plate.

15. A kitchen appliance as claimed in claim 13 wherein joining means are provided for joining said lower cross webs to said base plate of said kitchen appliance.

16. A kitchen appliance as claimed in claim 15 wherein said joining means is selected from the group consisting of glue, screws, clamps and ultrasound welding.

17. A kitchen appliance as claimed in claim 13 wherein a width of said upper cross webs corresponds approximately to a width of said lower cross webs.

18. A kitchen appliance as claimed in claim 1 wherein said at least one blade row is detachably and interchangeably secured to said base plate.

19. A kitchen appliance as claimed in claim 1 wherein said at least one blade row is comprised of a plurality of individual blades.

20. A kitchen appliance as claimed in claim 1 wherein said at least one blade row deviates from a 90° angle with respect to said cutting direction and said cutting edges extend at right angles to said cutting direction.

21. A kitchen appliance as claimed in claim 1 wherein said at least one blade row includes first and second blade rows which are both arranged between said first and second sliding faces of said base plate.

22. A kitchen appliance as claimed in claim 22 wherein said first and second blade rows are offset relative to one another.

23. A kitchen appliance as claimed in claim 1 wherein said upper cross web of said at least one blade row forms duokerf blades having said cutting edges.

24. A kitchen appliance as claimed in claim 1 wherein said base plate included a contour in an approach region adjacent to said at least one blade row which comprises an arc pointing in the direction of said upper surface of said base plate.

* * * * *